US008128336B2

(12) United States Patent
Kramp (10) Patent No.: US 8,128,336 B2
(45) Date of Patent: Mar. 6, 2012

(54) DEVICE FOR GRIPPING A COMPACT DISC

(75) Inventor: Alfred Kramp, Amsterdam (NL)

(73) Assignee: Microservice Tecnologia Digital da Amazonia LTDA, Manaus (BR)

( * ) Notice: Subject to any disclaimer, the term of this patent is extended or adjusted under 35 U.S.C. 154(b) by 269 days.

(21) Appl. No.: 12/307,207

(22) PCT Filed: Jul. 2, 2007

(86) PCT No.: PCT/NL2007/000165
§ 371 (c)(1),
(2), (4) Date: Dec. 31, 2008

(87) PCT Pub. No.: WO2008/004859
PCT Pub. Date: Oct. 1, 2008

(65) Prior Publication Data
US 2009/0317222 A1    Dec. 24, 2009

(30) Foreign Application Priority Data

Jul. 3, 2006    (NL) ..................................... 1032100

(51) Int. Cl.
*B65H 3/00* (2006.01)
*B25B 9/00* (2006.01)
(52) U.S. Cl. ..................... 414/796.9; 414/908; 414/941; 294/100; 294/93
(58) Field of Classification Search .................. 294/100, 294/27.1, 34; 369/30.55; 414/732, 746.5, 414/796.5, 796.9, 908, 910, 941
See application file for complete search history.

(56) References Cited

U.S. PATENT DOCUMENTS

| 3,104,018 | A | * | 9/1963 | Booth ........................ 414/795.6 |
| 4,173,368 | A | * | 11/1979 | Haverbusch .................... 294/88 |
| 4,236,967 | A | * | 12/1980 | Batjukov et al. .............. 376/271 |
| 4,283,082 | A | * | 8/1981 | Tracy ................................ 294/15 |
| 4,604,024 | A | * | 8/1986 | Edwards et al. .............. 414/592 |
| 4,676,710 | A | * | 6/1987 | Shiraishi .................. 414/223.01 |
| 4,798,349 | A | * | 1/1989 | Manservisi ................... 242/551 |

(Continued)

FOREIGN PATENT DOCUMENTS

DE          19644158        4/1998

(Continued)

OTHER PUBLICATIONS

International Search Report dated Nov. 11, 2007, in PCT application.

*Primary Examiner* — Gregory Adams
(74) *Attorney, Agent, or Firm* — Young & Thompson (57) ABSTRACT

The invention relates to a device for gripping a CD from the top of a stack for automated processing, by putting actuated deflectable fingers in the central opening of the CD. Axial displacement is used to force the fingers radially outward. The axial displacement is advantageously provided by abutting a relatively axially displaceable part of the gripper against a fixed object and continue axial displacement of the gripper. Use is made of an arrangement similar to the actuating mechanism of a ball-point to extend and retract the writing tip or the mechanical arrangement used in electrical micro switches operated by a push button (e.g. the Short Stroke Key Switches of ITT Industries). This arrangement is combined with an electrical switch to detect the extended or retracted position of the fingers to provide a corresponding electrical signal to a control means.

9 Claims, 8 Drawing Sheets

U.S. PATENT DOCUMENTS

| | | | |
|---|---|---|---|
| 4,821,972 A * | 4/1989 | Grollimund et al. | 242/523.1 |
| 5,275,424 A * | 1/1994 | Watanabe | 279/2.03 |
| 5,485,436 A | 1/1996 | Forget | |
| 5,734,629 A | 3/1998 | Lee | |
| 5,897,153 A * | 4/1999 | Philipps et al. | 294/93 |
| 5,997,204 A * | 12/1999 | Ducrocq | 401/109 |
| 6,065,791 A * | 5/2000 | Anders et al. | 294/116 |
| 6,187,026 B1 * | 2/2001 | Devlin et al. | 606/205 |
| 6,220,640 B1 | 4/2001 | Jensen | |
| 6,848,113 B2 | 1/2005 | Klein | |
| 6,990,674 B1 | 1/2006 | Cummins | |
| 2002/0009022 A1 | 1/2002 | Britz | |
| 2002/0067979 A1 * | 6/2002 | Ichikawa et al. | 414/334 |
| 2003/0002400 A1 | 1/2003 | Klein | |
| 2005/0105949 A1 | 5/2005 | Suden | |
| 2005/0157605 A1 * | 7/2005 | Lilland et al. | 369/30.36 |
| 2005/0214106 A1 * | 9/2005 | Ionescu | 414/744.1 |
| 2006/0005209 A1 | 1/2006 | Chiang | |

FOREIGN PATENT DOCUMENTS

| | | | |
|---|---|---|---|
| EP | 0795423 | | 9/1997 |
| GB | 2230508 A | * | 10/1990 |

\* cited by examiner

DEVICE FOR GRIPPING A COMPACT DISC

The present invention relates generally to a device (also named "gripper") for gripping a CD (compact disc) or other object, such as a DVD (digital versatile disc) or other article with an opening (preferably axially positioned and/or circular), particularly for subsequent processing operations. In particular, the invention relates to improvements to the gripper head with which the object is actually gripped.

In the following, the invention is elaborated by way of its application to gripping a CD. It will however be appreciated that the invention is also applicable to other fields.

A gripper according to the prior art is known from, i.a., U.S. Pat. No. 6,220,640 B1 or U.S. Pat. No. 5,734,629, which documents give background information which is also useful to better understand the present invention. The gripper can be part of an apparatus for automated processing of recordable CDs. With the gripper, a disc can be taken from the top of a stack of discs, moved to another location and put down there. The axially positioned circular opening of the CD is used by the gripper by putting deflectable fingers in the opening. These fingers are actuated by a solenoid.

Generally, the gripper includes an elongated arm, one end of which carries the gripper head, the opposite end of which is mounted such that the arm can move the gripper head to different locations where an object is to be taken up or put down. Mounting means of the gripper arm are such that one or more of different types of movement of the gripper arm are possible, e.g. translating, rotating or pivoting parallel or perpendicular to the plane of the CD, or combinations thereof. Examples are provided by U.S. Pat. Nos. 6,990,674 B1, 6,848,113 B1, US-A1-2005/0105949 and US-A1-2006/0005209, the contents of which is enclosed in here by reference.

The object of the present invention is versatile and relates, a.o., to one or more of the following aspects: elimination of a solenoid to actuate the gripper, small number of moving parts, cheap production, safe, accurate and/or reliable operation, low maintenance costs, longlivety, low energy consumption, high operation speed, robust, quickly replaceable. Further objects are presented by the following description.

The object of the invention is obtained by the features as defined in the appended claims.

By preference, for engaging and disengaging of the gripper with the object, the gripper is provided with an arrangement comprising a component that is displaceable between an extended and a first retracted position, in both which positions it is biased towards the extended position by a mechanical biasing element, such as a spring, and in both which positions it is retained in position by mechanical retaining means, while the arrangement is such that the component can be brought from the first retracted towards the extended position by initially moving or loading it towards the first retracting position, preferably such that the component is displaced towards a non-retained second retracted position beyond the first retracted position and further away from the extended position.

By preference, the arrangement is also such that the component can be brought from the extended towards the first retracted position by displacing it towards and beyond the first retracting to the second retracted position.

Obviously the retaining means, particularly for the first retracted position, are activated and released by displacing or loading the component towards the second retracted position, preferably from the first retracted position. The retaining means are e.g. operated by a pivoting, swivelling or turning movement of transmission means provided by an engaging actuating means coupled with the displacing component. The transmission means comprise e.g. alternatingly co-operating, mutually movable ridges.

Typically, the component displaces in a linear or axial direction. Obviously this component is preferably mechanically driven by forcing the gripper head against the object or part thereof. Thus, activation of the component, and thus the gripper head, is carried out by movement of the gripper towards and away from the object to be gripped. Thus this arrangement itself needs no electrical supply.

Obviously, the displacement of the component results in actuation of gripping means, such as spring force biased fingers, for gripping the object by extending and retracting parts of the gripping means.

This arrangement is in a preferred embodiment similar to the actuating mechanism of a ball-point to extend and retract the writing tip. According to that similarity, the component is to be regarded as the press button at the top of the ball-point. As is well-known, this press button has two retained positions; extended and retracted. To switch between these positions, one pushes the press button down beyond the retracted position and than releases it. By this action, the means for retaining the press button in the retracted position are switched on and off in an alternating manner, retaining or releasing, respectively, the press button in the retracted position. This is provided by a stepwise turning movement of a transmission that is actuated by the displacement of the press button, providing at each first step that mutual movable ridges engage, which disengage at each second step.

Also, this arrangement is preferably similar to the mechanical arrangement used in electrical micro switches operated by a push button (e.g. the Short Stroke Key Switches of ITT Industries; www.ittcanon.com). Using such switch in the present invention is advantageous since these are cheap standard components of small dimensions, high quality and tight tolerances, while the stroke of the component is accurately defined.

When this arrangement is combined with an electrical switch, the extended or retracted position of the component can conveniently be detected by the switch which can provide a corresponding electrical signal to a control means.

The invention and its advantages are further illustrated by way of a non-limiting, presently most preferred embodiment as shown in the appended drawing, showing in.

Figure 1:
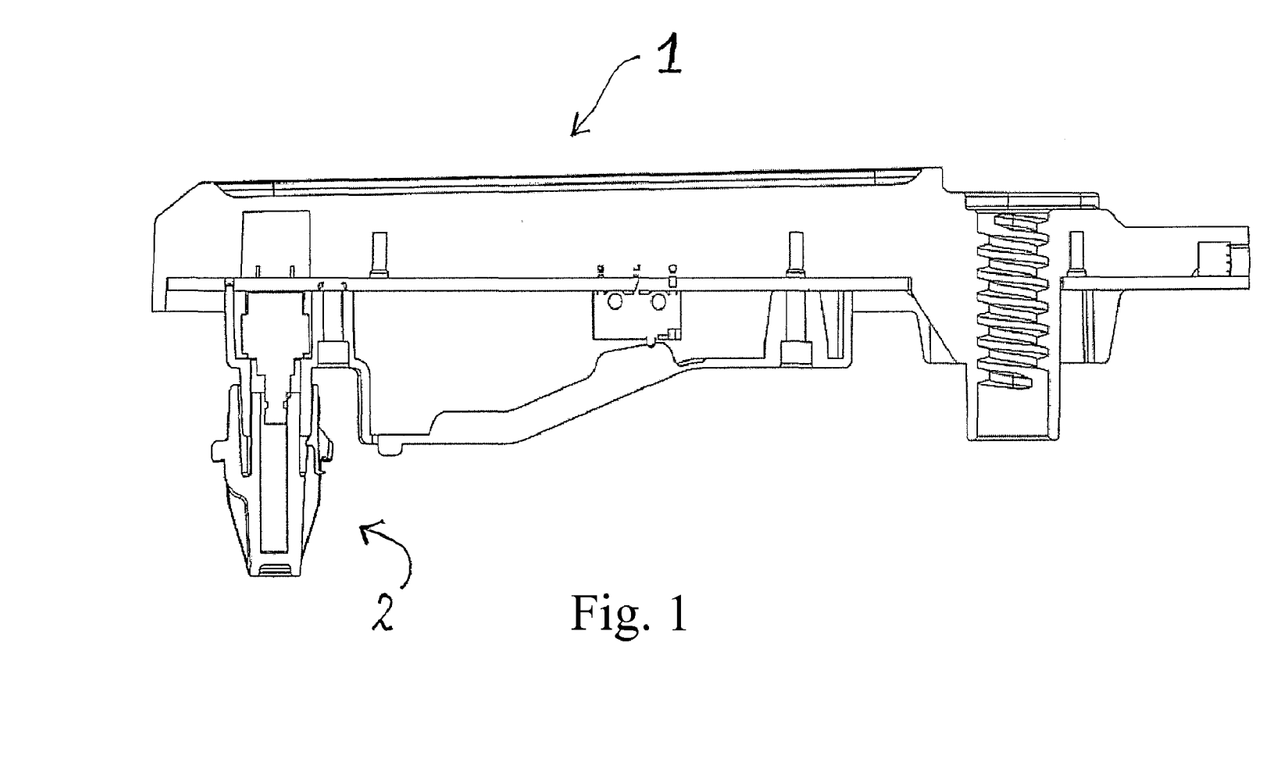
FIG. 1 a side view of the gripper with parts broken away.

The gripper has a cantilevered arm 1 the one end of which is mounted to motoric displacing means (not shown) of the device such that the opposite end of the arm 1, carrying the gripper head 2, can be spatially moved.

The gripper head 2 comprises a press button actuated micro switch 3, housed in a housing 4 and a finger arrangement 5. The housing 4 is fixedly mounted to the arm 1 of the gripper. A stud 6 (FIG. 2) projects axially from the switch 3. This stud 6 is arranged to carry the generally used push button to operate the switch 3 by pushing the button to linearly (axially) displace the stud 6. In this embodiment, in stead of the push button the stud 6 carries a finger arrangement 5 that is displaceable with the stud 6. The finger arrangement 5 is fixedly mounted to the projecting part of the stud 6.

Figure 2:
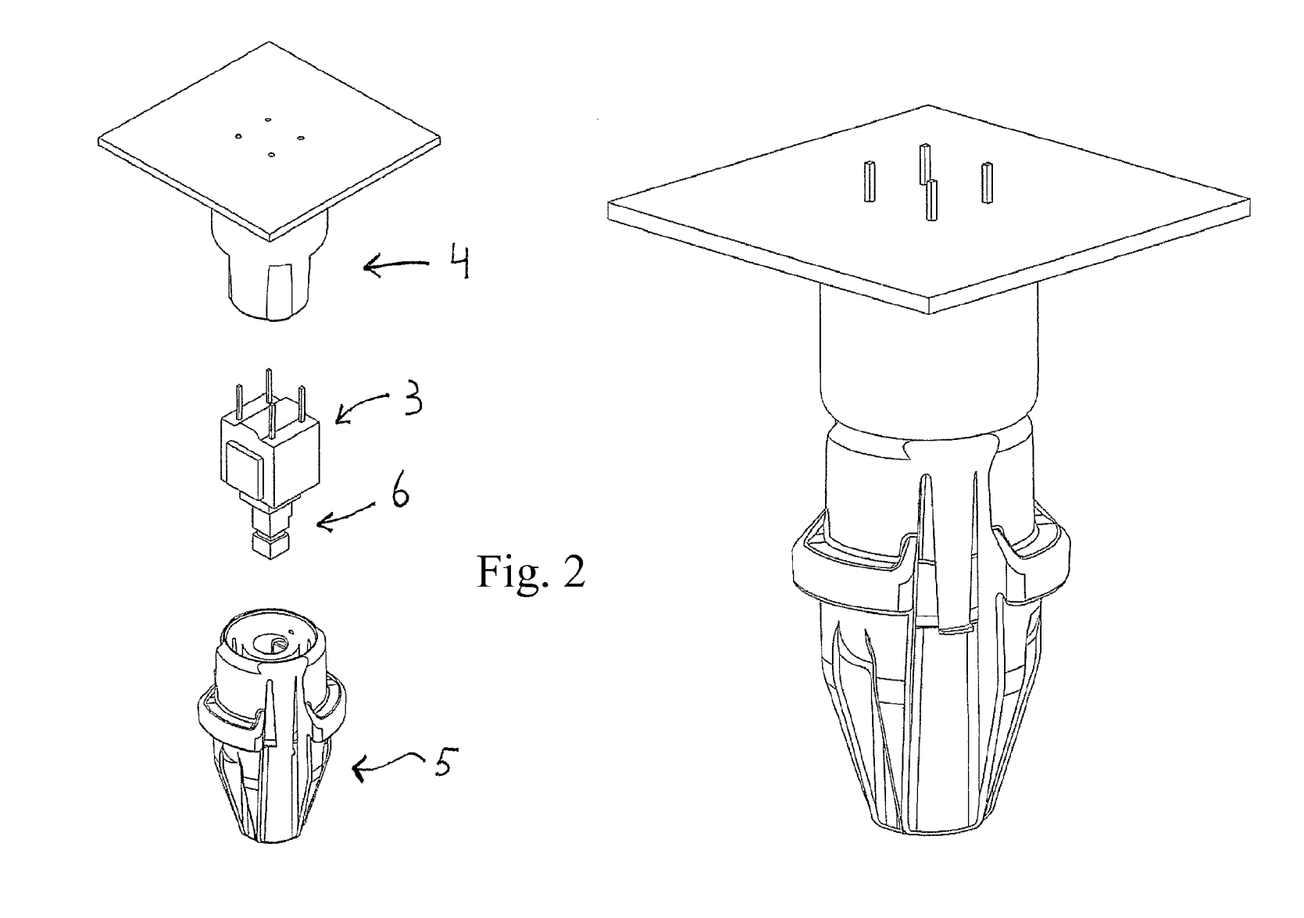
FIG. 2 a perspective view of the gripper head, both in the assembled condition and in exploded view.
Figure 3A:
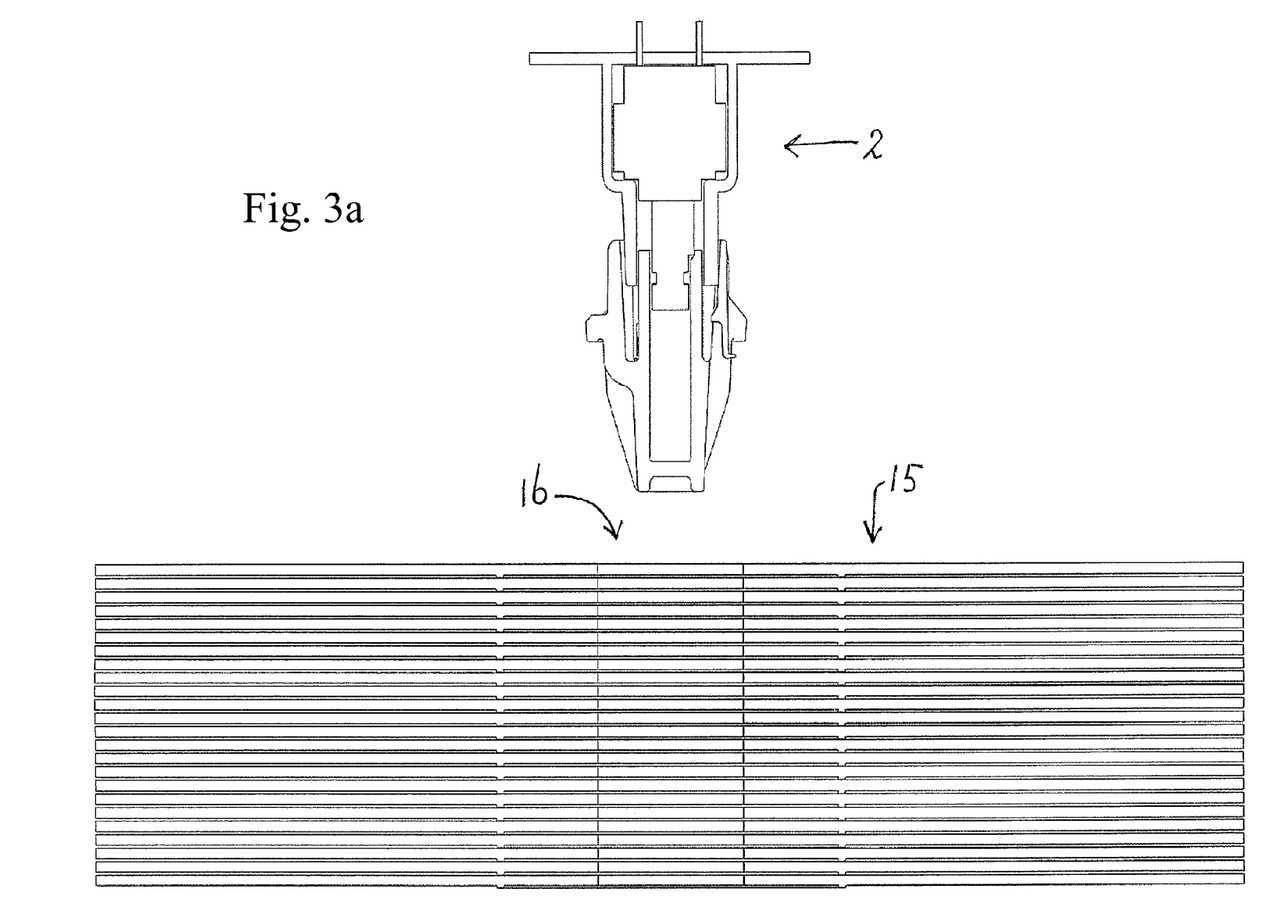
FIGS. 3a-3e sectional side views of the gripper head during several stages when gripping a disc.
Figure 3B:
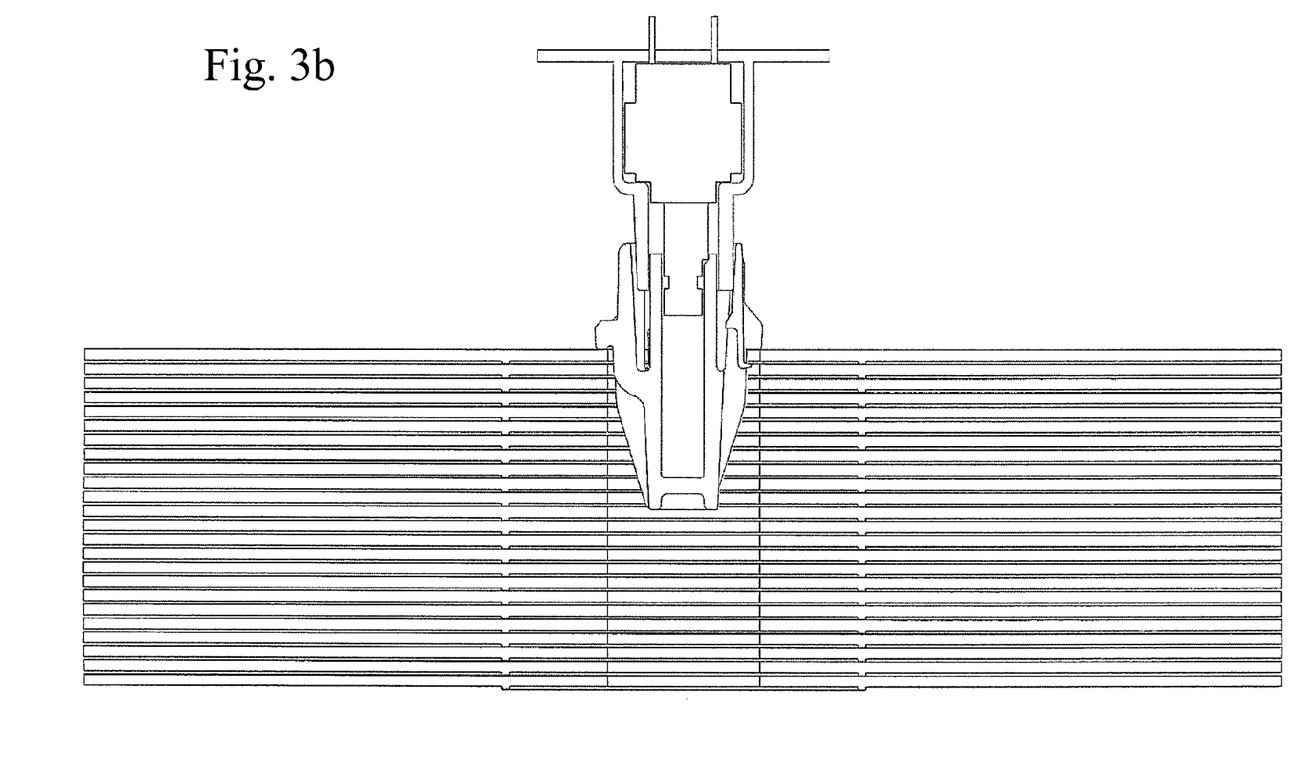
Figure 3C:
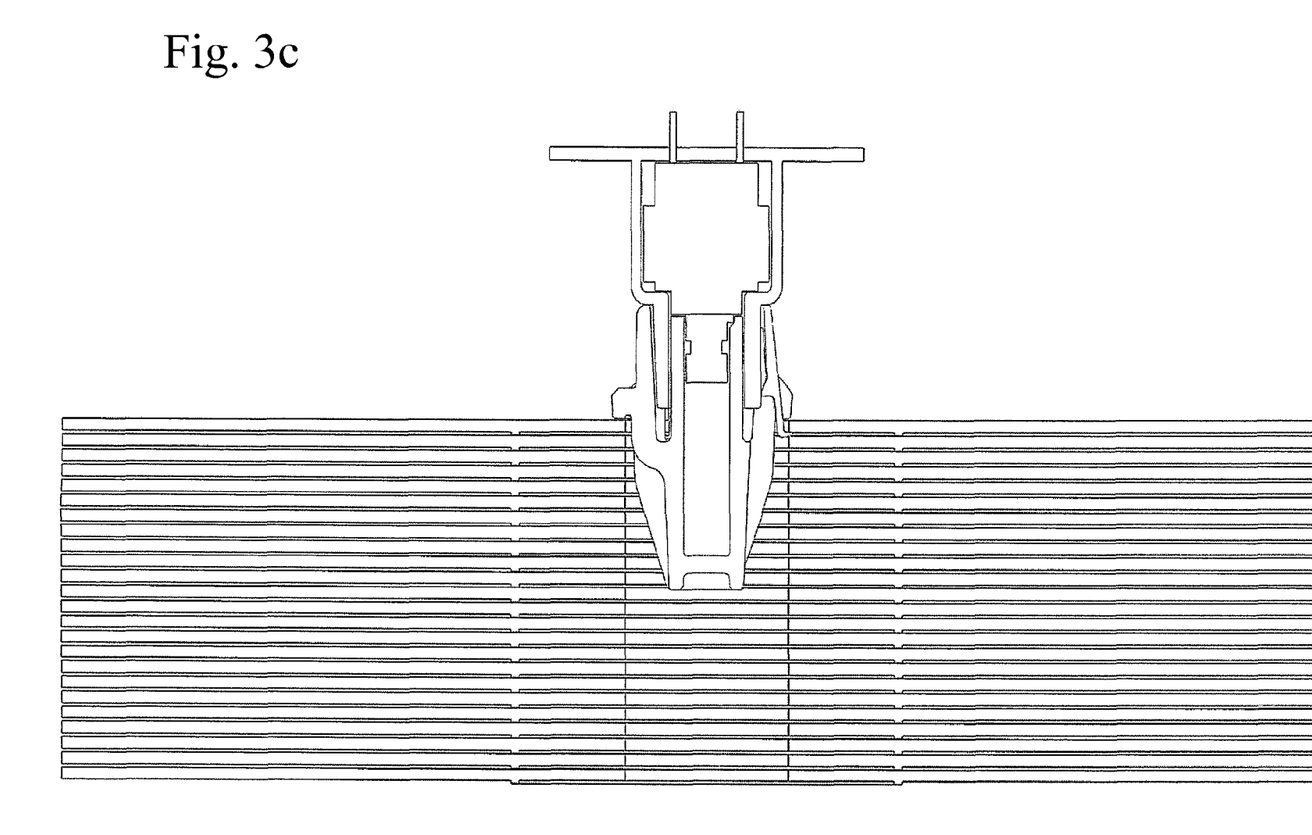
Figure 3D:
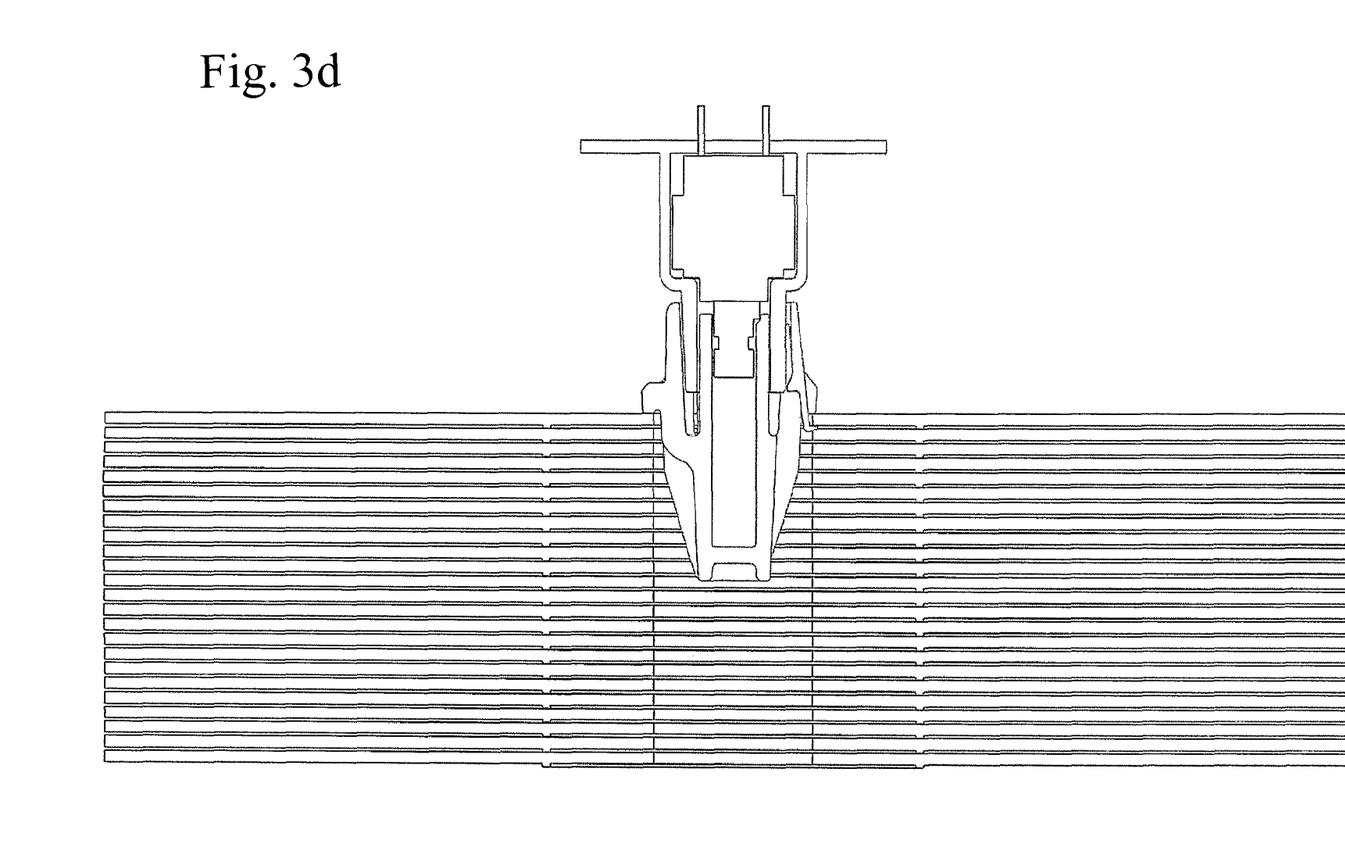
Figure 3E:
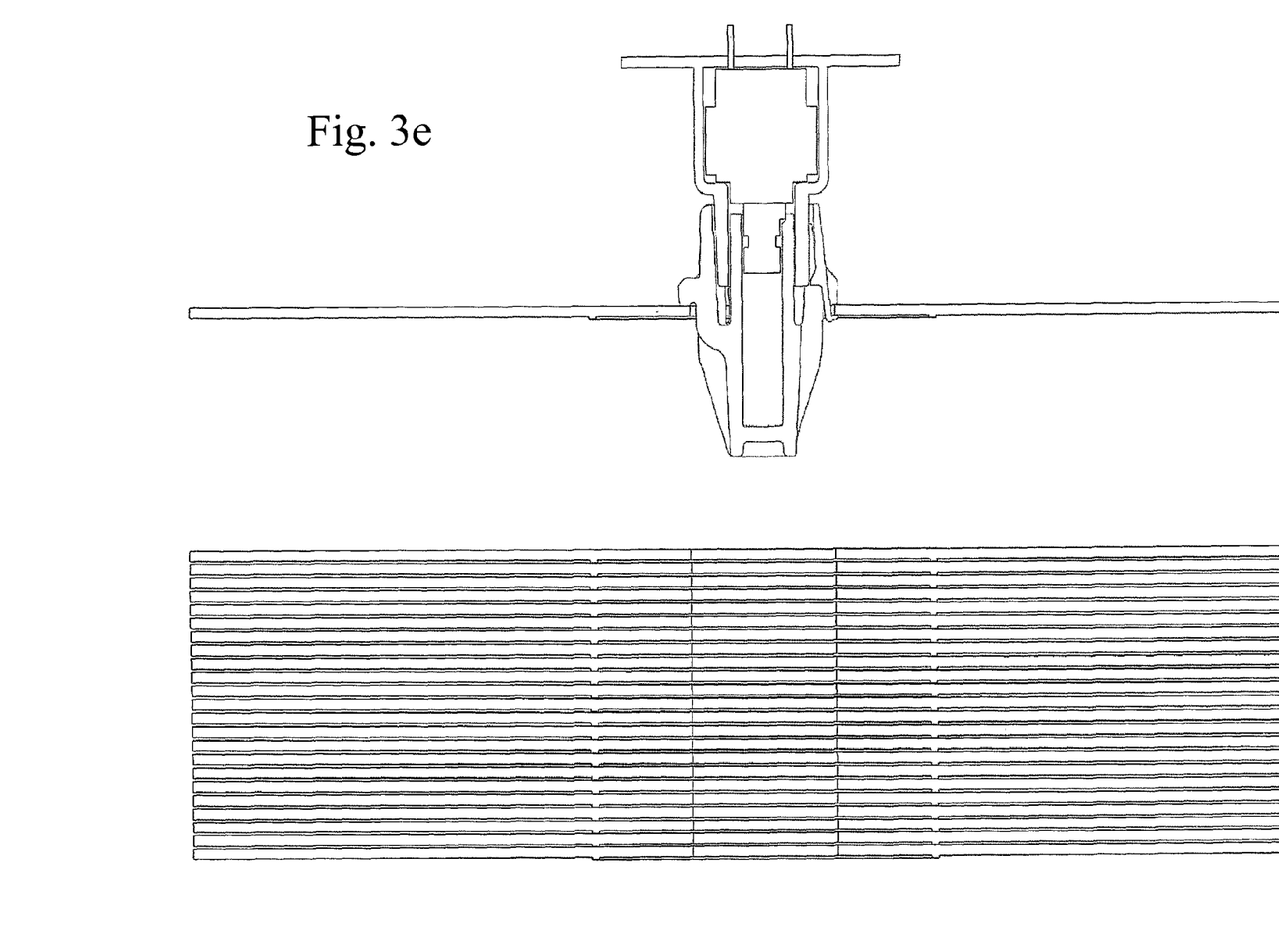

As known as such, the body of the switch 3 contains mechanical biasing means and releasable, mechanical retaining means such that the stud 6 can take a retained extended and retracted (axial) position, respectively. The retaining means are switched between the operative and inoperative position by axial displacement of the stud 6, providing a movement of transmission means within the body of the switch that operate the retaining means.

The finger arrangement 5 comprises three fingers 7 with outwardly turned hooks at their free ends. Their opposite ends are fixedly mounted. Because of the material properties and dimensions, the free ends of the fingers 7 can radially deflect outwardly when conveniently loaded, such that the hooks 8 move radially outwardly. Thus the hooks 8 can take a radially retracted and extended position.

This load is provided by the housing 4 comprising ridges 9 at positions corresponding to the fingers 7. This detail is further elaborated in the following.

Figure 4:
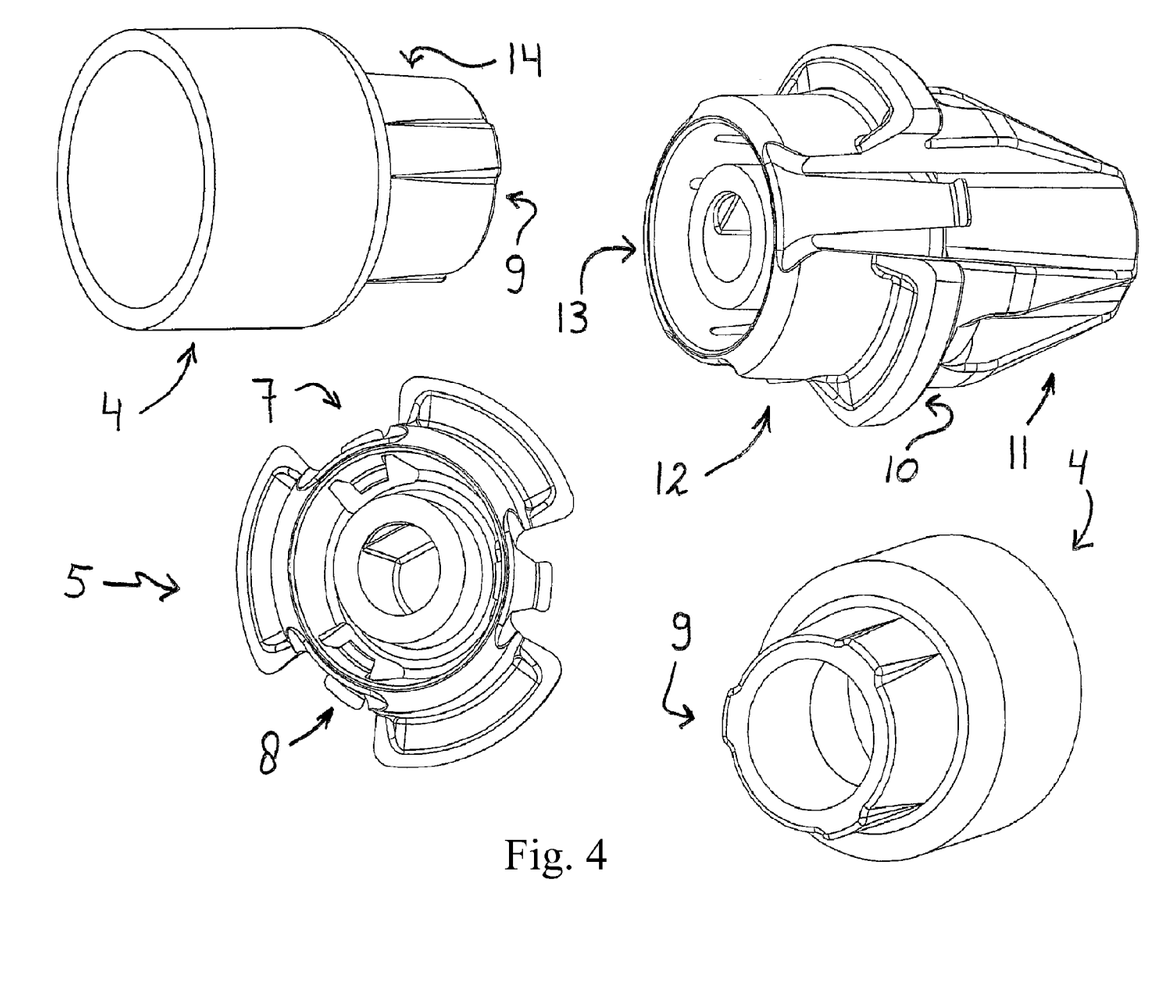
FIG. 4 a perspective view from aside and below of two parts of the gripper head.

The finger arrangement 5 is externally provided with a abutment shoulder 10. This shoulder 10 extends radially further outward than the hooks 8, at least in the radially retracted position of the hooks 8. The axial end 11 of the finger arrangement 5 is conical. The opposite end 12 (facing the housing 4) has a ring shaped space 13 to slidably receive the facing end 14 of the housing 4.

The operation is as follows (FIGS. 3a-3e).

Initially is the stud 6 in the axially extended position and the hooks 8 are in the radially retracted position. The bottom end 14 of the housing 4 is partly inserted in the space 13 at the top end 12 of finger arrangement 5.

The arm 1 is horizontally moved above a registered stack of discs 15, until the finger arrangement 5 is registered with the central hole 16 in the discs. Then the arm 1 is moved downwardly such that the conical end 11 of the finger arrangement 5 is inserted into the hole 16. Continued downward movement provides that the shoulder 10 abuts the top face of the top disc. Continued downward movement from that point provides mutual axial displacement between the finger arrangement 5 and the housing 4, such that they are further mutually inserted. The stud 6 is simultaneously pressed into the switch 3 while the ridges 9 force the hooks 8 outward. The hooks 8 grip below the edge of the top CD. As soon as the stud 6 has made a sufficient stroke, the relevant retaining means are operated and the switch gives a corresponding signal. This initiates upward movement of the arm 1. Due to the resilient restore force from within the switch 3, this initially provides a small axial displacement of the stud 6 away from the housing 4, until the stud 6 is locked in its retracted position by the retaining means, also locking the hooks 8 in their radial outward forced position, hooking under the top disc. By continued upward movement of the arm 1, the top disc is lifted from the stack by the gripper.

To place a disc on top of a stack, the above procedure is carried out in the opposite succession.

It will be appreciated that the vertical distance between the shoulder 10 and a hook 8 approximates at least the thickness of the part of the object that should be engaged by the hook 8.

Of course, the invention also covers other embodiments, e.g. provided by adapting the shape of one or more of the illustrated components. The elements (ridges 9) for outwardly forcing of the hooks 8 can e.g. be different. Also the shape of the shoulder 10 or the hooks 8 can differ. Elements can e.g. be interchanged between parts, e.g. the ridges 9 can be provided on the hooks 8 or the stud 6 can be fixed to the housing 4 and the switch 3 can be fixed to the finger arrangement 5.

Advantageously, an axial displacement is used to force hooks radially outward. The axial displacement is advantageously provided by abutting a relatively axially displaceable part of the gripper against a fixed object and continue axial displacement of the gripper.

All disclosed or in the drawing illustrated features provide as such or in arbitrary combination the subject matter of this invention, also irrespective of their arrangement in the claims.

The invention claimed is:

1. A device for gripping a CD or DVD object with an axially positioned circular opening, for subsequent processing operations, and designed to be part of an apparatus for automated processing of a stack of CD or DVD objects, to take an object from the top of a stack of objects, move it to another location and put it down there, wherein the device having a gripper head comprising gripping means, puts said gripping means in the opening of the object, which device comprises the following features:

a cantilevered arm (1) the one end of which is mounted to motorised displacing means such that the gripper head (2) at the opposite end of the arm 1 can be spatially moved;

a press button actuated micro switch (3) housed in a housing (4) and having an axially displaceable stud as an axially displaceable member (6) to carry a push button and having mechanical biasing means and releasable, mechanical retaining means such that the stud can take a retained extended and a first retracted axial position, respectively, in both which positions it is biased by the mechanical biasing means towards the extended position and in both which positions it is retained in position by the mechanical retaining means, while the switch (3) is arranged such that the stud can be brought from the first retracted towards the extended position by initially moving it from the first retracted position towards a non-retained second retracted position beyond the first retracted position and further away from the extended position and wherein the switch (3) is such that the stud (6) can be brought from the extended towards the first retracted position by displacing it towards and beyond the first retracted position to the second retracted position;

a finger arrangement (5);

transmission means to operate the retaining means;

the finger arrangement (5) comprising at least two fingers (7) with outwardly turned hooks (8) at their free ends, designed to radially deflect when conveniently loaded, such that the hooks (8) move radially;

ridges (9) at positions to provide the load for deflecting the fingers (7);

the finger arrangement (5) being externally provided with an abutment shoulder (10);

the shoulder (10) extending radially further outward than the hooks (8), at least in the radially retracted position of the hooks 8; and the axial end (11) of the finger arrangement (5) is conical.

2. A device according to claim 1, designed to operate as follows with a stack of CD's:

while the member (6) is in the axially extended position and the finger arrangement (5) is in the radially retracted position, the facing end (14) of the housing (4) is at least partly inserted in the space (13) at the top end (12) of finger arrangement (5) and the finger arrangement (5) is registered with the central hole (16) in a stack of discs such that the shoulder (10) abuts the top face of the top disc, whereafter axial movement from that point provides mutual axial displacement between the finger arrangement (5) and the housing (4), such that they are further mutually inserted such that the member (6) is simultaneously pressed into the switch (3) while the ridges (9) force the hooks (8) outward such that they grip below the edge of the top CD while when the member (6) has covered a sufficient stroke, the relevant retaining means are operated and the switch gives a corresponding signal which initiates upward movement of the arm (1), initially providing a small axial displacement of the member (6) away from the housing (4), until the member (6) is locked in its first retracted position by the retaining means, also locking the hooks (8) in their radial outward forced position, hooking under the top disc.

3. A device according to claim 1, wherein the vertical distance between the shoulder (10) and a hook (8) approximates at least the thickness of the part of the object that should be engaged by the hook (8).

4. A device according to claim 1, wherein the end (12) which is opposite end (11) has a ring shaped space 13 to slidably receive the facing end (14) of the housing (4) in respect of which member (6) is movable.

5. A device for gripping a recordable disc, like a CD or DVD with axially positioned opening (16) for subsequent processing operations, to be part of an apparatus for automated processing of the discs, to take a disc from the top of a stack of discs, move the disc to another location and put the disc down there, the device comprising:

gripping means with parts (8) that can be extended and retracted, which gripping means are designed to be put in the opening of the disc, and gripping the disc by extending the parts (8) for hooking under the disc, and an arrangement having an axially displaceable member (6) that can take a retained axial extended position and a retained axial first retracted position by the action of mechanical retaining means of the device, the design being such that displacement of the member (6) results in actuation of the parts (8); and a push button actuated micro switch (3) having an axially displaceable stud to carry a push button, said stud provides said axially displaceable member (6), while said switch (3) contains mechanical biasing means and said releasable, mechanical retaining means such that said extended and retracted position of the member (6) correspond to operative switching positions of the micro switch, wherein the stud is movable with regard to the recordable disc between the retained axial extended position and the retained axial first retracted position upon forcing the device against the recordable disc, wherein the parts (8) are deflectable fingers.

6. A device according to claim 5, wherein the member (6), is both in the extended and a first retracted position biased towards the extended position by the mechanical biasing means, and in both which positions the member (6) is retained in position by the mechanical retaining means, while the arrangement is such that the member be brought from the first retracted towards the extended position by initially moving the member (6) from the first retracted position towards a non-retained second retracted position beyond the first retracted position and further away from the extended position, and wherein the arrangement is such that the member (6) can be brought from the extended towards the first retracted position by displacing the member (6) towards and beyond the first retracted position to the second retracted position.

7. An apparatus for automated processing of recordable discs to take a disc from the top of a stack of discs, move the disc to another location and put the disc down there for subsequent processing operations, comprising a device according to claim 5.

8. A device according to claim 5, comprising a cantilevered arm (1) the one end of which is mounted to motorised displacing means such that the gripping means at the opposite end of the arm (1) can be spatially moved.

9. A device according to claim 5, wherein the micro switch transitions from one of a conductive state and a non-conductive state when the stud transitions from one of the retained axial extended position and the retained axial first retracted position.

\* \* \* \* \*